United States Patent [19]

Takikawa

[11] Patent Number: 4,856,739

[45] Date of Patent: Aug. 15, 1989

[54] ELONGATED MEMBER FIXING DEVICE BY USE OF CLAMP

[75] Inventor: Kazunori Takikawa, Numazu, Japan

[73] Assignee: Usui Kokusai Sangyo Kaisha Ltd., Shizuoka, Japan

[21] Appl. No.: 221,646

[22] Filed: Jul. 20, 1988

[30] Foreign Application Priority Data

Jul. 21, 1987 [JP] Japan .................. 62-111681[U]
Sep. 17, 1987 [JP] Japan .................. 62-142160[U]

[51] Int. Cl.[4] ............................................. F16L 3/08
[52] U.S. Cl. ................................ 248/74.2; 248/74.3; 248/316.1
[58] Field of Search .................. 248/74.2, 74.1, 74.3, 248/65, 60, 62, 309.1, 316.1, 67.7; 24/563

[56] References Cited

U.S. PATENT DOCUMENTS

| 3,181,827 | 5/1965 | Sassin | 248/74.2 |
| 3,194,524 | 7/1965 | Trumbull | 248/74.2 |
| 3,216,685 | 11/1965 | Raymond | 248/74.2 |
| 4,655,424 | 4/1987 | Oshida | 248/74.2 X |

FOREIGN PATENT DOCUMENTS 0315048 7/1929 United Kingdom ............... 248/74.1

*Primary Examiner*—Ramon O. Ramirez
*Attorney, Agent, or Firm*—Anthony J. Casella; Gerald E. Hespos

[57] ABSTRACT

A fixing device using a clamp for fixing an elongated member to a basic structure.

In case a small-sized elongated metallic or resin tube, wire harness, rod or cable is fixed to a basic structure, it has been usual to use a fixing device like a bandlike clamp to the elongated member. The fixing mechanism of such clamp has been such that the elongated member is passed through a semicircular coiled portion formed at one end of the clamp and the inner surface of the coiled portion of the clamp is brazed to the entire contact portion of the outer periphery of the elongated member.

However, the clamp of the above type is disadvantageous because impact applied on the member or vibrations transmitted to the member from the basic structure are not absorbed causing damage on the member or clamp.

The present invention eliminated the above disadvantages of the conventional clamp in such a manner that when the elongated member is fixed to the semicircular coiled portion of the clamp, only the free end portion of the clamp is brazed to the outer periphery of the member covered by the clamp leaving a space therebetween so that impact or vibrations applied on the elongated member are absorbed thereby preventing the member from being damaged or cracked.

20 Claims, 3 Drawing Sheets

PRIOR ART

ELONGATED MEMBER FIXING DEVICE BY USE OF CLAMP

BACKGROUND OF THE INVENTION

1. Field of the Invention

The present invention relates to a fixing device using a clamp for attaching an elongated member to a basic structure and more particularly to an improvement in a mechanism of engaging and fixing the elongated member to the basic structure. The elongated member may be a metallic tube, resin tube, wire harness, rod or cable having a comparatively small diameter of less than about 20 m/m and generally serving as an oil or air supply passage of an automobile, or as one of constitutional elements of various kinds of machines and equipment.

2. Description of Prior Art

One example of the conventional fixing device of the above type is such that as shown in FIG. 13, where an elongated member such as a small-sized tube P' is attached to a basic structure, the outer periphery of the P' is fastened to a clamp 11 having a fitting hole 13 at one end, a flat fitting wall 12 and a hook wall 14 which is coiled larger than a semicircle at the lower end of the flat fitting wall 12, in such a manner that the entire outer periphery of the tube P' is fastened to the inner surface of the hook wall and the free end or the entire inner surface of the hook wall and the outer periphery of the tube P' contacting the former are brazed by heating as at 15.

Another example, as shown in FIG. 14, is such that the outer peripheries of elongated members of different diameters such as a large-sized tube P'' and a small-sized tube P' are fastened to the entire inner surfaces of a couple of fastening walls 16 and 16' each coiled larger than a semicircle at both ends of a bandlike clamp 11 and the contact surfaces of the tubes and the fastening walls are brazed tightly by heating as at 14 and 14' respectively.

However, the former device has had the disadvantage that it provides a fixing mechanism by engagement of the outer periphery of the small-sized tube P' with the entire inner surface of the coiled hook wall 14 of the clamp 11 and since the distance between the fitting wall 13 and the hook wall 14 of the clamp 11 is short, when the tube P' is laid in position, external impact applied on the tube P' and the vibrations thereof transmitted to the tube from the basic structure are not absorbed and damped. Further, the latter device has also had such disadvantages that it provides a fixing mechanism by the engagement of the outer peripheries of the large-and small-sized tube P'' and P' with the entire inner surfaces of the fastening walls 16 and 16', respectively, formed at both ends of the clamp 11 and therefore, when the tubes are laid in position, impact on the large-sized tube P'' and vibrations thereof transmitted to the small-sized tube P' are not absorbed and damped so that the tubes, especially the small-sized one, is liable to get deformed or fatigued or produce noises and when the tube is made of an extremely thin material, the mechanical strength of the tube deteriorates due to the tube being heated locally by the manual brazing operation which results in a cracking or damage of the portion adjacent the fastening portion of the clamp member 11. Further, as the larger and small-sized tubes P'' and P' are fastened to the fastening walls 16 and 16' coiled more than semicircles of diameters substantially equal to those of the tubes, a trouble is incurred in moving the tubes in the longitudinal direction through the coiled fastening walls and moreover, should the tubes include bent portions, the passage of these bent portions through the fastening walls are often hindered. In addition, due to the difference of bending accuracy between the tubes P'' and P' or the difference of the fixing position or angle of the clamp 11, when the tubes are laid in position, the tubes and the clamp 11 are sometimes deformed or applied with residual stress because of an unreasonable way of fixing them and the structure fails to meet the expansion and contraction of the tubes due to a temperature change resulting in generating a thermal stress.

SUMMARY OF THE INVENTION

Accordingly, an object of the present invention is to provide a fixing device for fixing an elongated member to a basic structure, which is capable of absorbing vibrations applied on an elongated member both in the axial and radial directions, rotational or angular deflections of the member and the residual or thermal stress generating in the elongated member by damping or releasing them in an effective manner.

Another object of the present invention is to provide a fixing device of the above type which is capable of avoiding the possibility of the elongated member getting deformed, scratched, fatigued, cracked or damaged, or of generating interference noises at the clamped portion thereof.

Still another object of the present invention is to provide a fixing device of the above type which is capable of facilitating the elongated member fastening operation by holding the member through a coiled section of the clamp leaving a space from the latter so that even when the elongated member is bent, it can be smoothly passed through the coiled section and further that the deformation of the elongated member which may take place due to an unreasonable manner of fixing the elongated member and clamp resulting from the difference of the shape of the bent elongated member or the clamp fastening position and angle can be prevented.

According to a first embodiment of the present invention, there is provided a fixing device for fixing an elongated member to a basic structure, which comprises a bandlike clamp having a fitting section for attachment to a basic structure and a coiled section at at least one end thereof leaving a space therein and a small-diametered elongated member passed through, and fixed to the inner surface of the free end portion of, the coiled section of the clamp.

According to a second embodiment of the present invention, there is provided a fixing device using a bandlike clamp having a substantially flat fitting section for attachment to a basic structure and a coiled section at one end thereof so that an elongated member such as a tube or rod is passed through the coiled section at a desired position leaving a space from the inner surface of the clamp and fixed to at least the free end portion of the coiled section.

According to a third embodiment of the present invention, there is provided a fixing device using a bandlike clamp having a flat fitting section for attachment to a basic structure, an arc-shaped bent section formed at one end thereof and a coiled section at the other end thereof so that a large-sized and a small-sized metallic tube arranged parallel to or crossed each other are held by the arc-shaped bent section and the coiled section, respectively, and the free end portion of the arc-shaped bent section and that of the coiled section are fixed to the outer peripheries of the tubes, respectively, at desired positions.

DETAILED DESCRIPTION OF THE INVENTION

Figure 1:
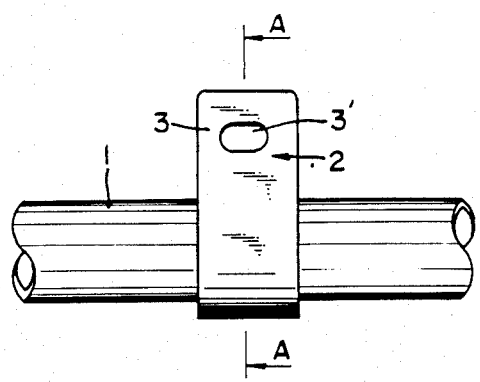
FIG. 1 is a plan view of a fixing device comprising a clamp as one embodiment of the present invention.
Figure 2:
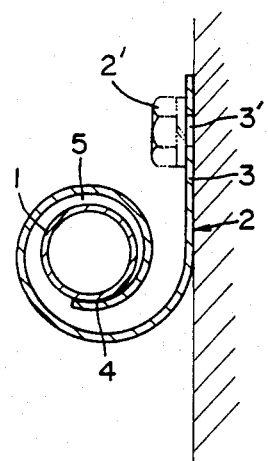
FIG. 2 is a sectional view taken along A—A line of FIG. 1.

The embodiments of the present invention will now be described with reference to FIGS. 1 through 12 wherein like parts are designated by like reference numerals.

Referring to FIGS. 1 through 9, reference numeral 1 designates an small-sized elongated member such as a metallic or resin tube serving as an oil or air supply passage, or a wire harness, rod or cable as one of constitutional elements of a mechanism and reference numeral 2 designates a bandlike clamp preferably made of an elastic material and provided with a flat fitting section 3 having a fitting hole 3' drilled near one end of the clamp member 2 and a coiled section at the other end of the member 2. To fix the elongated member 1 to a basic structure, the elongated member 1 is passed through the coiled section and brazed to the inner surface of the free end of the coiled section as at 4 with the remaining portion of the tube 1 keeping a space 5 from the inner surface of the latter surrounding the tube 1 and then the flat fitting section 3 of the clamp is secured to the basic structure with a bolt inserted through the fitting hole 3'.

Figure 3:
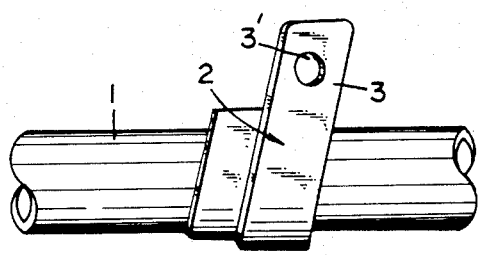
FIGS. 3 through 7 are views showing another embodiment of the present invention and corresponding to FIG. 1.

Further, the coiled section of the clamp 2 may be shaped by coiling one end portion thereof in a plane normal to the axis of the elongated member 1 (See FIG. 1) or coiling spirally in the axially direction of the member 1 (See FIG. 3). Reference numerals 6, 6' designate means for fixing the elongated member 1 made of a resin material, which means are each in the form of a thermally contractible small-sized annular socket separately attached in advance to the elongated member so as to generally embrace the portion of the elongated member 1 fastened to the inner engaging surface of the bent or coiled section at one end portion of the clamp 2 whereby when the entire sockets 6, 6' (or only the embraced portion) are heated to a temperature of about 100° C., the embraced portion is compressed due to the thermal contraction of the sockets themselves thereby fastening the elongated member 1 to the clamp 2 as at 4, 4' (See FIG. 4).

Figure 5:
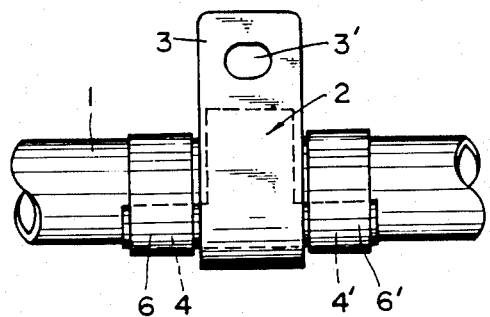
Figure 4:
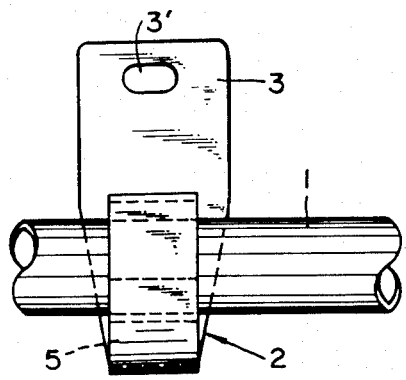
Figure 6:
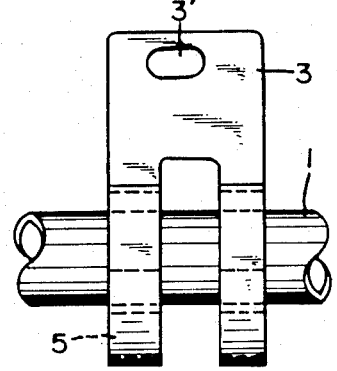
Figure 7:
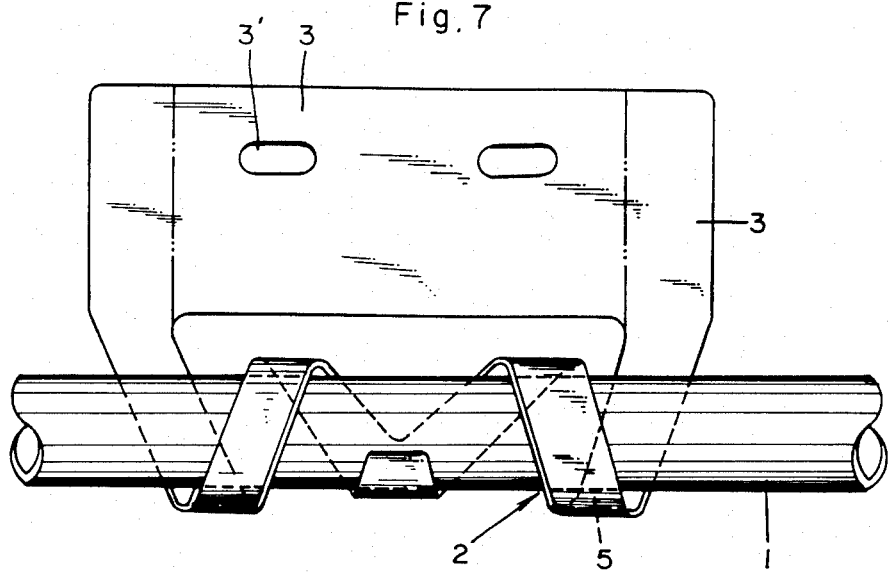
Figure 8:
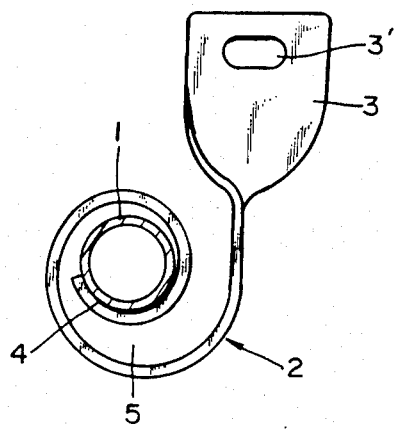
FIG. 8 is a front view of still another embodiment of the present invention.

Further, the coiled portion of the clamp 2 may be tapered or bifurcated as shown in FIGS. 5 and 6 or the bifurcated coiled sections are made continuous to provide a substantially V-shaped section between them so that the V-shaped section is fixed to the outer periphery of the elongated member 1 as shown in FIG. 7, or the clamp 2 itself is formed in the shape of V as shown by the two-dot chain lines in FIG. 7 so that the V-shaped section is secured to the outer periphery of the elongated member 1.

Figure 9:
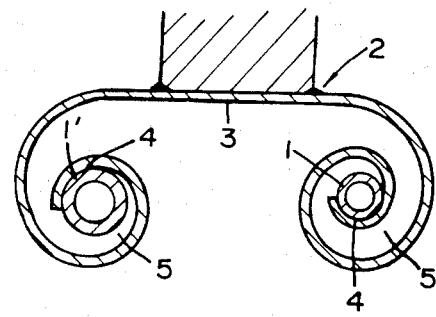
FIG. 9 is a further embodiment of the present invention and corresponding to FIG. 2.

Further, the flat fitting section 3 of the clamp 2 may be bent by a predetermined angle (e.g., 90 degrees in FIG. 8) to become parallel to the axis of the elongated member 1, or two coiled portions may be formed on both sides of the bandlike clamp 2 so that two elongated members 1, 1' may be fastened to the single clamp as shown in FIG. 9. In the latter case, the flat fitting section 3 is formed at substantially the center of the clamp 2 so that the clamp is attached to the basic structure by brazing or with a bond or a bolt as in the cases of the previous embodiments.

Figure 10:
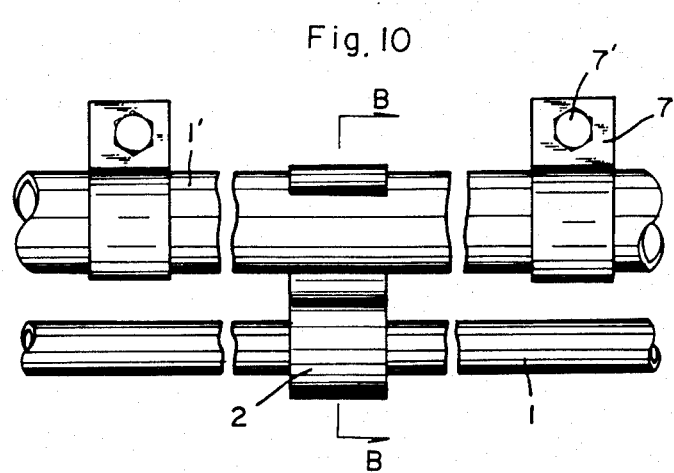
FIG. 10 is a plan view of still further embodiment of the present invention wherein elongated members are clamped by a clamp.
Figure 11:
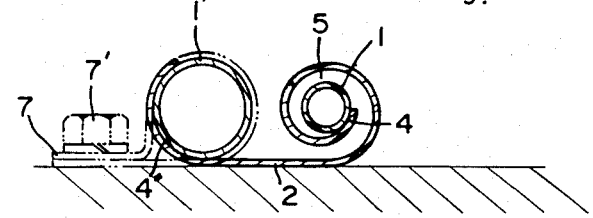
FIG. 11 is a front view taken along B—B line of FIG. 10.
Figure 12:
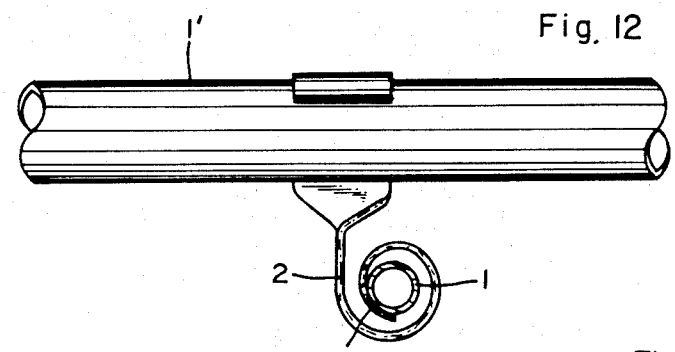
FIG. 12 is a modification of the embodiment shown in FIG. 10.
Figure 14:
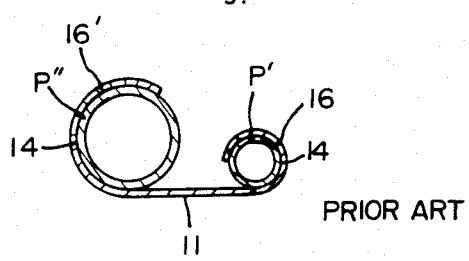
FIGS. 13 and 14 are vertical sectional views of a conventional fixing device, respectively.
Figure 13:
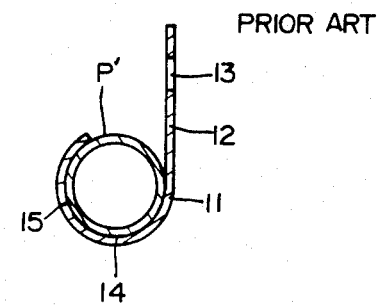

Next, in FIGS. 10 through 12, reference numeral 1 designates a small-sized elongated member as in the cases of the previous embodiments and reference numeral 1' designates a large-diametered elongated member used for the same purpose as the elongated member 1. Reference numeral 2 designates a clamp including a coiled section at one end and an arc-shaped bent section at the other end so that the small-sized elongated member 1 is passed through the coiled section at a desired position with the inner end portion of the coiled section fixed to the outer periphery of the elongated member 1 by brazing as at 4 while the large-sized elongated member 1' is held in the arc-shaped bent section at a desired position with the outer periphery of the member 1' fixed to a suitable portion of the inner surface of the bent section by brazing as at 4''. In this case, the clamp is attached to a basic structure through a separate clamp 7 of known type with a bolt 7'.

Further, the clamp 2 may have two coiled sections in the same plane intersecting at right angles with the axes of the large- and small-sized elongated members (See FIG. 10) as in the cases of the previous embodiments, or formed spirally in the direction of the axis of each of the members (See FIG. 3). Alternatively, the clamp may be formed by twisting band strip at right angles as shown in FIG. 12 or (although not shown) it may be twisted by a desired angle so that the axes of the elongated members 1 and 1' intersect each other when they are clamped. Further, the width or thickness of the arc-shaped bent section may be reduced, or the free end portion of the coiled section may be drawn inwardly so as to make the space 5 narrower.

As described above, the fixing device of the present invention has the following functions. That is, in the case of the clamp 2 having the coiled section at one end and the bent section at the other end, the small-sized tube 1 of a diameter slightly smaller than that of the coiled section may be inserted into the coiled section at a desired portion and fixed to the latter by brazing the free end portion of the coiled section leaving the space 5 between the inner surface of the coiled section and the outer periphery of the tube 1. Similarly, the large-sized tube 1' may be held by the bent section at a desired portion and brazed to a part of the inner surface of the latter. Then the entire clamp 2 is attached to the basic structure directly or through another clamp fixed to the bent section. In addition, in the case of using the sockets 6 and 6', the small-sized tube 1 is fixed to the clamp as at 4, 4' or 4, 4" due to the thermal contraction of the sockets. Therefore, when the two coiled sections are formed in the same plane (See FIGS. 1, 4 and 10), external impact mainly applied on the small-sized tube in the radial direction are absorbed and the rotational and angular deflections of the tube are released or damped by the presence of the space 5. Further, in the case of the clamp having the axially extending spiral section (See FIG. 3), the same effects can be expected in the axial direction of the tube.

Thus the present invention is advantageous in that due to the above-described structure, external impact and vibrations applied on the tube both in the radial and directions, the rotational and angular deflections of the tube and the residual and thermal stresses generating therein can be absorbed by effectively releasing and damping them, so that the tube is free from deformations, scratches and fatigues thereby preventing it from being cracked or damaged at its clamped portion, and further that the attachment of the device to the tube is facilitated and at the same time, even when the tube has a bent portion, it can be smoothly passed through the clamp.

What is claimed is:

1. A fixing device for attaching a small-sized elongated member to a basic structure, said fixing device comprising a bandlike clamp having a fitting means to be attached to the basic structure and a coiled section formed at least one end thereof, said coiled section having an inner surface defining a cross section greater than the cross section of the small-sized elongated member, said small-sized elongated member being fixed to a selected portion of the inner surface of the coiled section of the clamp, and being spaced from other portions of the inner surface.

2. A fixing device according to claim 1 wherein the fitting means of said clamp comprises a substantially flat filling section and a through hole through which said clamp is attached to the basic structure with a bolt.

3. A fixing device according to claim 1 wherein the fitting means of said clamp comprises a substantially flat fitting section and means for connecting the fitting section to the basic structure.

4. A fixing device according to claim 1 wherein the coiled portion of said clamp is tapered.

5. A fixing device according to claim 1 wherein the fitting means includes a flat surface and wherein the coiled section of said clamp defines a center axis aligned at a predetermined angle to the flat surface of the fitting means.

6. A fixing device according to claim 1 wherein said elongated member is fixed to the coiled section of said clamp by fixing means selected from the group consisting of brazing and bonding.

7. A fixing device according to claim 1 wherein the small-sized elongated member is fixed to the coiled section of said clamp by heat contracted circular rings protruding sideward from both sides of said fitting means so as to embrace the coiled section of said clamp contacting the outer periphery of said elongated member.

8. A fixing device according to claim 1 wherein said clamp includes coiled sections at both ends thereof, a fitting means at substantially the center thereof so that elongated members are fixed to inner free end portions of said coiled sections, respectively.

9. A fixing device according to claim 1 wherein the fitting means of said clamp comprises a bent section fixed at one end thereof and a means for attaching to said heat bent section a large-sized elongated member fixed to the basic structure.

10. A fixing device according to claim 9 wherein the axis of said small-sized elongated member and that of the large-sized elongated member fixed to said basic structure makes a predetermined angle.

11. A fixing device according to claim 1 wherein said clamp is made of an elastic material.

12. A fixing device according to claim 1 wherein said small-sized elongated member is selected from the group consisting of a metallic tube, resin tube, wire harness, rod and cable.

13. A fixing device according to claim 1 wherein the coiled section of said clamp is in the form of an annular ring or spiral.

14. A fixing device according to claim 9 wherein said bent section is brazed to a large-sized metallic tube.

15. A fixing device according to claim 1 wherein the coiled portion of said clamp is bifurcated.

16. A fixing device for attaching a small-sized elongated member to a basic structure, said fixing device comprising a bandlike clamp having a fitting means to be attached to the basic structure and a coiled section formed at least one end thereof, said coil section having an inner surface, said elongated member being fixed to the inner surface of the coiled section by heat contracted circular rings protruding sideward from both sides of the fitting means so as to embrace the coiled section contacting the outer periphery of said elongated member.

17. A fixing device for attaching first and second elongated members to a basic structure, said fixing device comprising a bandlike clamp having a fitting means to be attached to the basic structure and first and second coiled sections formed at opposed ends thereof, said first and second elongated members being fixed to the inner end portions of the respective first and second coiled sections.

18. A fixing device for attaching a small-sized elongated member to a large-sized elongated member fixed to a basic structure, said fixing device comprising a bandlike clamp having a bent section fixed at one end thereof for attaching to the large-sized elongated member, and a coiled section formed at the opposed end of the bandlike clamp, said coiled section having an inner surface, with the small-sized elongated member being fixed to a portion of the inner surface.

19. A fixing device according to claim 18 wherein the axis of said small-sized elongated member and that of the large-sized elongated member fixed to said basic structure makes a predetermined angle.

20. A fixing device according to claim 18 wherein said bent section is brazed to a large-sized metallic tube.

* * * * *